United States Patent
Berghaus et al.

(10) Patent No.: US 6,930,411 B2
(45) Date of Patent: Aug. 16, 2005

(54) LINEAR MOTOR

(75) Inventors: Michael Berghaus, Darmstadt (DE); Mirco Jelusic, Muhltal (DE); Michael Kaiser, Enkenbach-Alsenborn (DE); Michael Lambrecht, Schallodenbach (DE); Eberhard Wehner, Enkenbach-Alsenborn (DE)

(73) Assignee: Quick-Rotan Elektromotoren GmbH, Kaiserslautern (DE)

( * ) Notice: Subject to any disclaimer, the term of this patent is extended or adjusted under 35 U.S.C. 154(b) by 385 days.

(21) Appl. No.: 10/298,600

(22) Filed: Nov. 19, 2002

(65) Prior Publication Data

US 2004/0095027 A1 May 20, 2004

(51) Int. Cl.[7] .................................................. H02K 9/00
(52) U.S. Cl. .......................................... 310/12; 310/15
(58) Field of Search ...................................... 310/12, 13

(56) References Cited

U.S. PATENT DOCUMENTS 4,546,277 A * 10/1985 Carbonneau ................. 310/13
6,164,224 A * 12/2000 Tachikawa ................... 112/68
6,330,864 B1 * 12/2001 Tajima ................... 112/470.18
6,564,732 B1 * 5/2003 Hosagasi et al. ........... 112/239

* cited by examiner

Primary Examiner—Nicholas Ponomarenko
Assistant Examiner—Iraj A. Mohandesi
(74) Attorney, Agent, or Firm—Antonelli, Terry, Stout & Kraus, LLP

(57) ABSTRACT

An essentially iron-free linear motor for a sewing device or sewing machine produces and controls the pressure on the material being sewn by means of a drive rod, with a tubular housing, with at least two annular permanent magnets located therein. Each of the magnets has a north pole and a south pole and is magnetized radially, each in a different magnetization direction, and with a coil divided into at least two partial coils wound in opposite directions and each associated with a permanent magnet, whereby the partial coils and the permanent magnets are mutually displace, involving drive rod, in a magnetic lock that is effected by the housing, by a core in the form of center piece, and an air gap with the coil. The partial coils are located inside housing and the permanent magnets are located between said coils and the center piece.

7 Claims, 1 Drawing Sheet

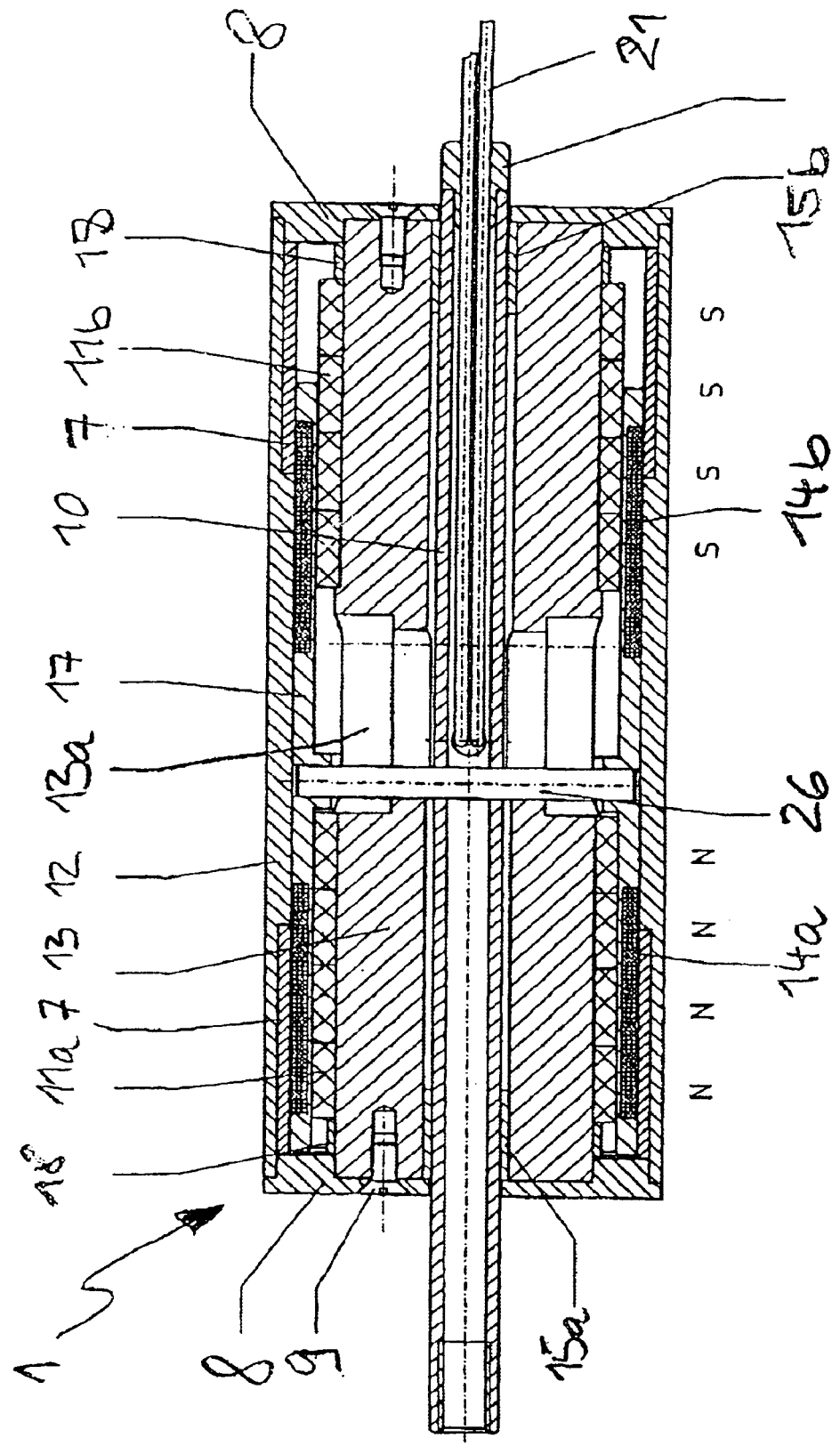

LINEAR MOTOR

The present invention relates to a linear motor according to the species in accordance with the preamble of the main claim.

Such a linear motor is known (DE 199 45 443 A1). These linear motors have proved their worth; however, they cannot handle high thermal loads.

In view of the disadvantages and inadequacies described above, the present invention addresses the goal of designing a linear motor according to the species that handles high thermal loads.

This goal is achieved in a linear motor according to the preamble of the main claim in accordance with the invention by its characterizing features, namely that the partial coils are located inside the housing and the permanent magnets are located between the latter and the center piece.

As the results of the partial coils being located according to the invention directly inside the housing, improved heat conduction to the outside of the housing is achieved. Moreover, the coils, because of their location radially further outside, have a larger outer surface than in the prior art, resulting in greater removal of heat. As a result, therefore, according to the teaching of the invention, a higher thermal load capacity is achieved in a surprisingly simple manner.

Further embodiments, features, and advantages of the present invention are described below with reference to a drawing that shows a linear motor in schematic cross section.

Linear motor 1 has a cylindrical housing 12 with two lids 8 sealing it above and below, a core designed as center piece 13 to which lids 8 are fastened by a screw 9, and an air gap with coil 14. Linear motor 1 also has two annular radially magnetized and spaced permanent magnets 11a, 11b by which the magnetic field is produced and which are mounted immovably and concentrically with respect to the center piece by spacing rings 18. Consequently, the magnetic circuit inside linear motor 1 can be closed by housing 12, center piece 13, and the air gap with coil 14a, 14b to the permanent magnets 11a, 11b.

By means of this, a force is generated in coil 14a, 14b as soon as an electric current passe through the coil. This force is proportional to the current strength and independent of the location of the coil as long as the latter is in the homogenous part of the magnetic field; the direction of the force is of course dependent on the direction of the current flow, with the direction and/or the strength of the current flow in linear motor 1 being controllable by a microprocessor.

As can be seen from the further description, a drive rod 10 is guided in center piece 13 by two bearing bushings 15a, 15b, said center piece having a centrally provided opening 13a.

A pin 26 is located in said opening and is connected positively with the drive rod 10. To transmit the driving force to the drive rod 10, this pin 26 is connected by a coil support 17 for coil 14, said coil support being displaceably mounted by a preferably coated slide bushing 7 inside the hollow cylindrical housing 12.

The directions of magnetization of the two permanent magnets are thus different: when for example in an annular permanent magnet 11a the inner surface has the magnetic south pole and the outer surface has the magnetic north pole, the direction of magnetization in the other annular permanent magnet 11b is reversed. Because of this, the magnetic feedback need only guide half of the main field. Because of this magnetic arrangement, coil 14 is divided into two partial coils 14a and 14b wound in opposite directions so that the total inductance of coil 14 is significantly lower with this type of winding than the inductance of a partial coil 14a, 14b, so that linear motor 1 can be controlled very rapidly.

Partial coils 14a, 14b are wound onto the coil support 17 which is made of non-magnetic material. As already mentioned, this coil support 17 is not firmly connected with drive rod 10 by means of pin 26.

To keep the inertial weight of linear motor 1 low, drive rod 10 is made hollow. Coil 14 and coil support 17 form the movable part of linear motor 1 so that the current is conducted to movable coil 14 by an electrical, for example two-wire, connection 21. This is guided outward through the hollow drive rod 10.

Another purpose of this pin 26 is to secure the drive rod 10 against twisting; in addition, the driving force is transmitted to drive rod 10 by pin 26.

The opposite winding directions of partial coils 14a, 14b ensure a small electrical time constant of linear motor 1, making possible the above-described angularly synchronous control.

What is claimed is:

1. Essentially iron-free linear motor (1) for a sewing device or sewing machine to produce and control the pressure on the material being sewn by means of a drive rod (10), with a tubular housing (12), with at least two annular permanent magnets (11a, 11b) located therein, said magnets each having a north pole and a south pole and being magnetized radially, each in a different magnetization direction, and with a coil (14) divided into at least two partial coils (14a, 14b) wound in opposite directions and each associated with a permanent magnet, whereby said partial coils and the permanent magnets are mutually displaceable, involving drive rod (10), in a magnetic lock that is effected by the housing (12), by a core in the form of center piece (13), and an air gap with the coil (14), characterized in that partial coils (14a, 14b) are located inside housing (12) and that permanent magnets (11a, 11b) are located between said coils and the center piece (13).

2. Linear motor according to claim 1, characterized in that partial coils (14a, 14b) are guided displaceably on the inside of housing (12).

3. Linear motor according to claim 1, characterized in that partial coils (14a, 14b) are located in a coil support (17) and are guided displaceably on the inside of housing (12).

4. Linear motor according to claim 1, characterized in that the coil support (17) and/or partial coils (14a, 14b) are displaceably guided in a slide bushing (7) provided on the inside of housing (12).

5. Linear motor according to claim 1, characterized in that the coil support (17) is positively connected by a pin (26) with drive rod 10).

6. Linear motor according to claim 1, characterized in that the center piece (13) has an opening (13a) in which the pin (26) connected with drive rod (10) is guided.

7. Linear motor according to claim 4, characterized in that the slide bushing is coated.

* * * * *